INVENTOR
WILLIAM B. TOWLES
R. R. Anderson
BY W. O. Quesenbery AGENT
Claude Funkhouser ATTORNEYS May 19, 1964 W. B. TOWLES 3,134,029

SHIFT REGISTER CIRCUIT

Filed Jan. 31, 1961 4 Sheets-Sheet 2

INVENTOR
WILLIAM B. TOWLES

BY AGENT
ATTORNEYS

SHIFT REGISTER CIRCUIT

Filed Jan. 31, 1961 4 Sheets-Sheet 3

INVENTOR
WILLIAM B. TOWLES

BY AGENT
ATTORNEYS

May 19, 1964 W. B. TOWLES 3,134,029

SHIFT REGISTER CIRCUIT

Filed Jan. 31, 1961 4 Sheets-Sheet 4

INVENTOR
WILLIAM B. TOWLES
R. R. Anderson

BY AGENT
W. O. Quesenberry
Claude Funkhouser ATTORNEYS

United States Patent Office 3,134,029

Patented May 19, 1964

3,134,029
SHIFT REGISTER CIRCUIT

William B. Towles, Windermere, Fla., assignor, by mesne assignments, to the United States of America as represented by the Secretary of the Navy Filed Jan. 31, 1961, Ser. No. 86,269
2 Claims. (Cl. 307—88.5)

This application is a continuation-in-part of application Serial No. 686,269 filed on September 25, 1957 now Patent 2,970,309, issued January 31, 1961, for Analog-to-Digital Converter.

The present invention relates to a shift circuit and more particularly to a shift circuit which facilitates the obtaining of a serial output from an analog-to-digital converter once the conversion is complete.

In the analog-to-digital converter disclosed in my copending application, mentioned above, an analog voltage is applied to the converter and, by successive approximation, the magnitude of this voltage is determined and stored in one or more units of an eight digit register. Once the conversion is complete the shift circuitry making up the present application is utilized to obtain, from the shift register, the digital equivalent of the applied analog voltage so that this digital equivalent may be further utilized in a telemetering system, for example.

An object of the present invention is the provision of a shift circuit for obtaining the digital equivalent from an analog-to-digital converter.

Another object is the provision of a shift circuit utilizing solid state components.

Another object is the provision of a shift circuit which is compact in size and rapid in operation.

Yet another object is the provision of a shift circuit requiring a very low power consumption.

Figure 1A:
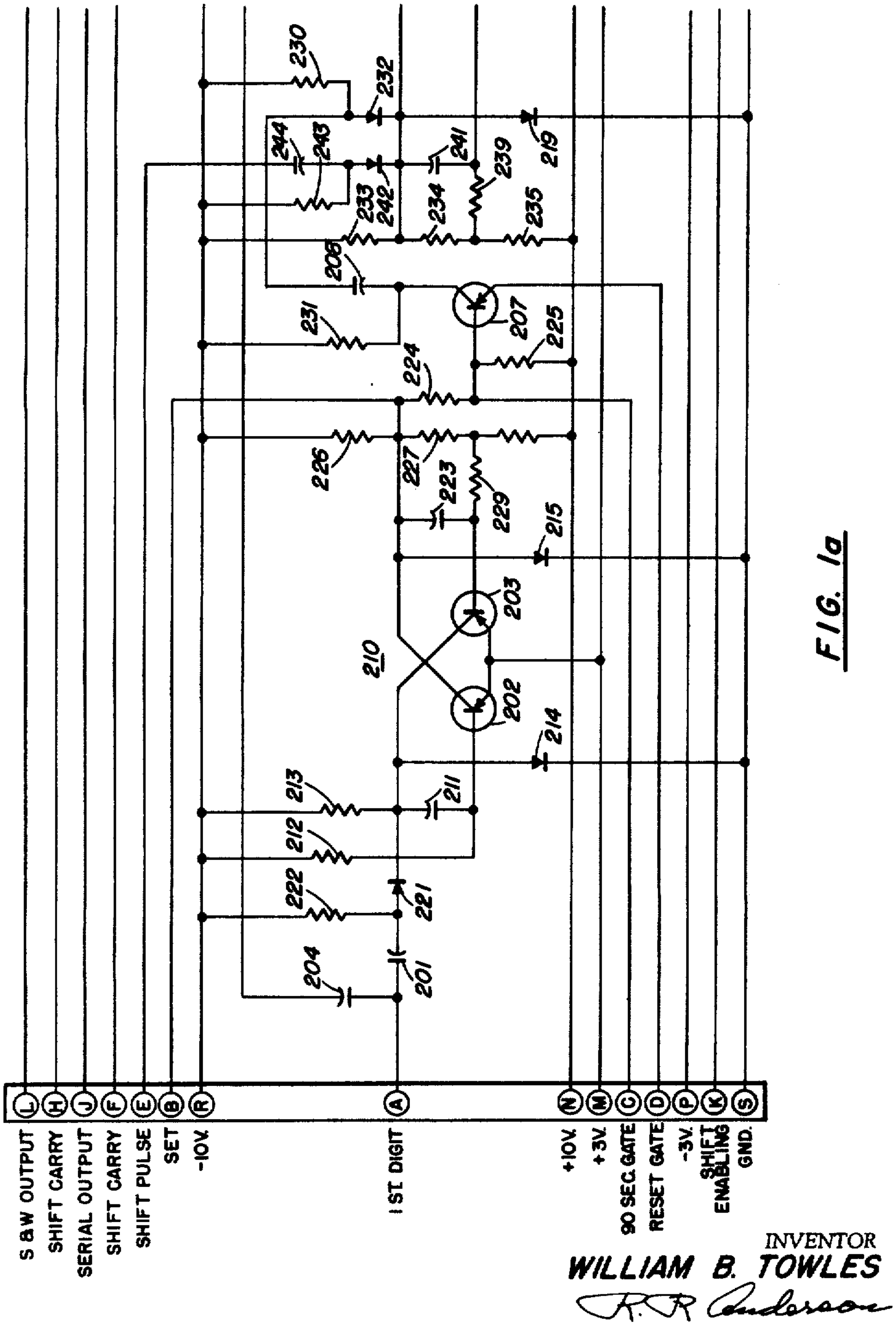
Figure 1B:
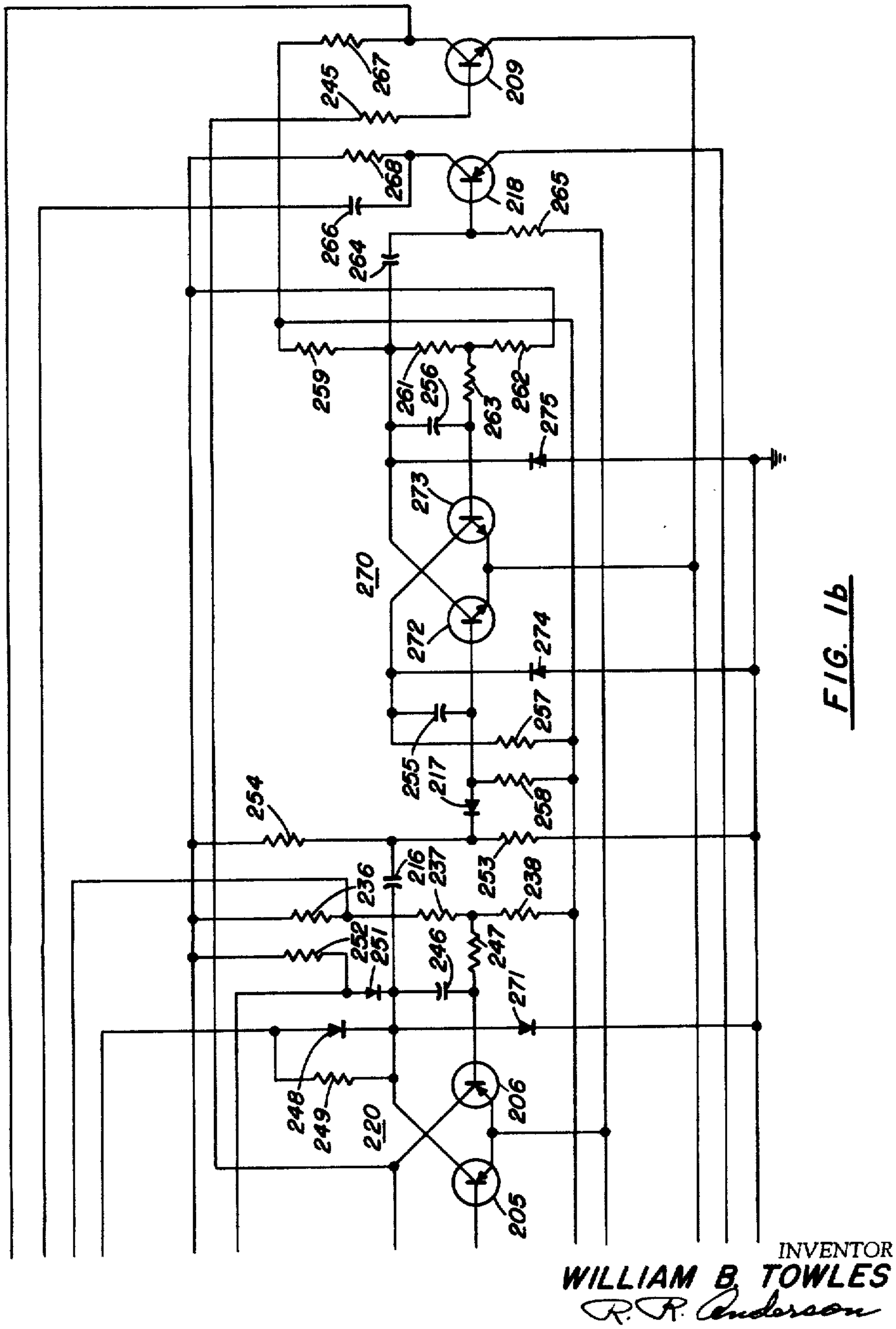

Other objects and many of the attendant advantages of the invention will be readily apparent as the same becomes better understood by reference to the following detailed description when considered in connection with the accompanying drawings wherein:

FIGS. 1*a* and 1*b* show a typical circuit making up one of the units of a digit register wherein the converted analog voltage is stored.

Figure 2A:
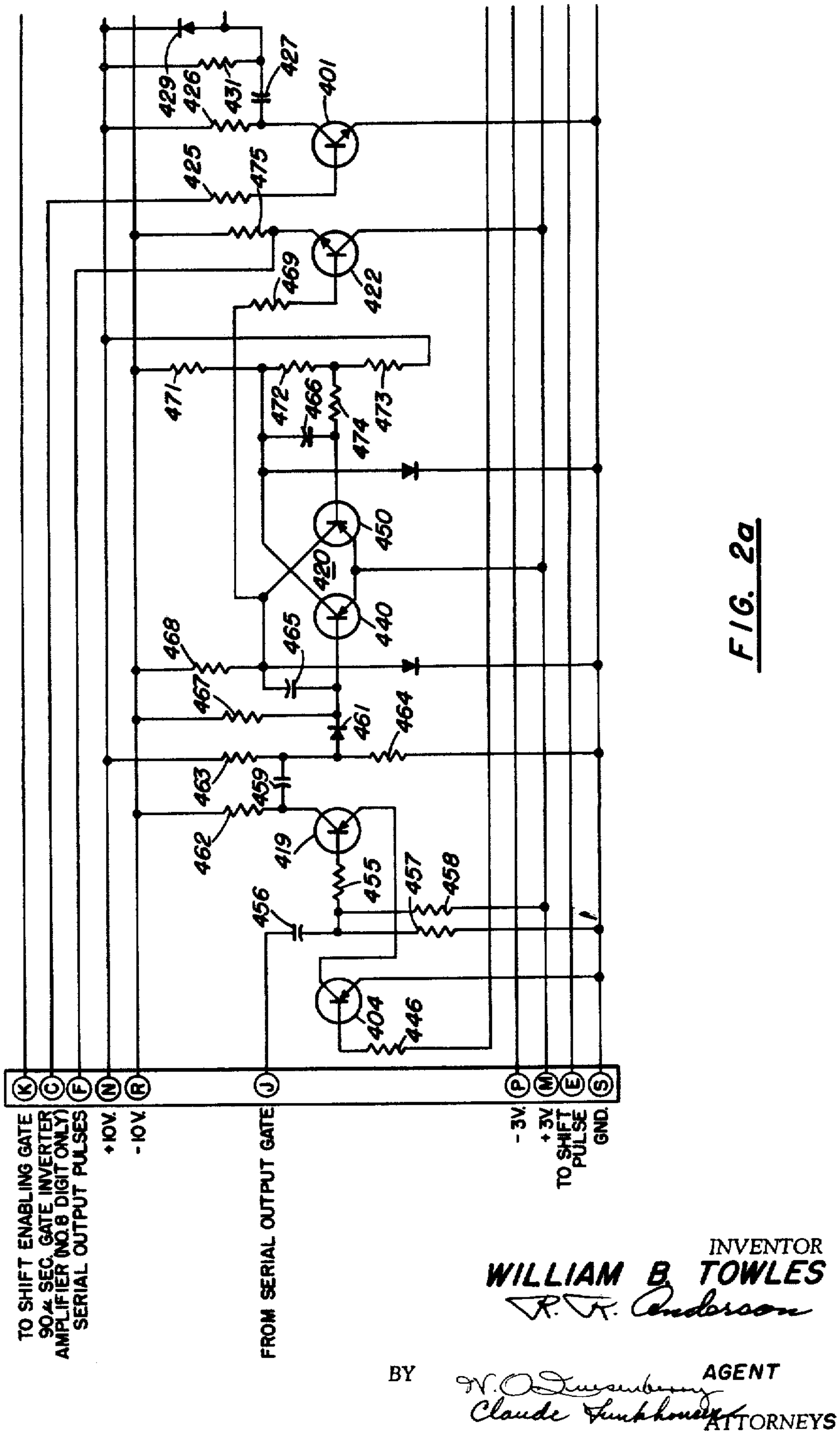
Figure 2B:
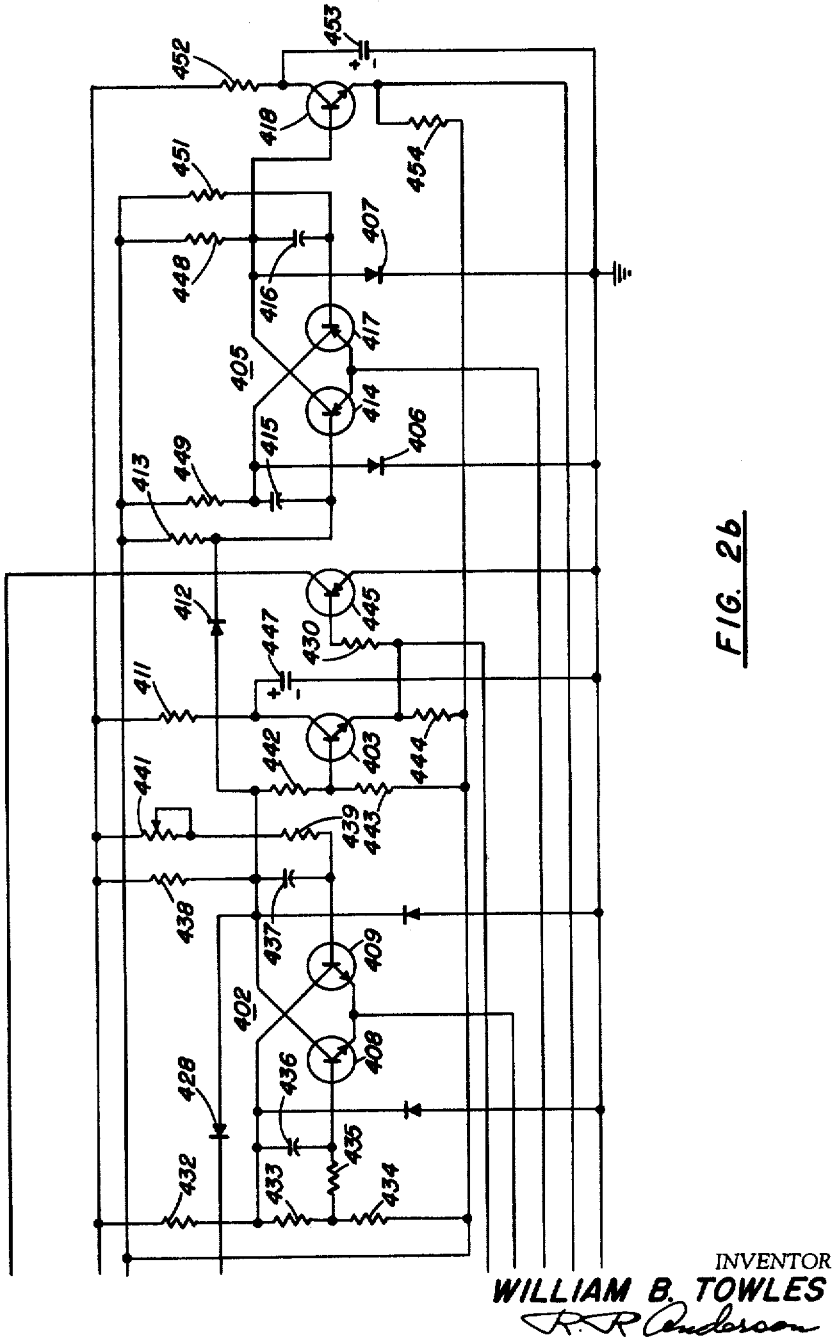

FIGS. 2*a* and 2*b* show a schematic of the shift circuit making up the present invention.

Referring now to the drawings wherein like characters designate like or corresponding parts throughout the several views there is shown in FIGS. 1*a* and 1*b* a schematic of the circuit of a typical digit card, or unit, making up a digit register. When the analog-to-digital conversion, as performed by the copending application identified previously, is being consummated, as each significant digit is converted, the information is stored in units as shown in FIGS. 1*a* and 1*b*.

The operation of the digit card is as follows: A positive "initiate" pulse, originating elsewhere in the converter, is coupled through capacitor 201 and diode 221 to "set" a first monostable multivibrator 210 which comprises transistors 202 and 203. Simultaneously, the initiate pulse is also coupled through capacitor 204 and diode 251 to "set" a second bistable multivibrator 220 which comprises transistors 205 and 206. When the monostable multivibrator 210 is "set" transistor 202 is turned off and transistor 203 is turned on. In the non-conducting condition, the collector of 202 becomes sufficiently negative to allow the emitter diode of a reset gate transistor 207 to be biased in a forward direction. This is equivalent to closing a switch in the reset gate circuit such that when a blocking oscillator pulse in the comparator circuit (not shown) is produced, a positive pulse is coupled through capacitor 208 that resets the first bistable multivibrator to its original condition. When the flip-flop 220 is in the "set" condition, transistor 206 is non-conducting and its collector voltage is about eight volts negative. This serves to bias off transistor 209 and thus release a clamping diode in the summing and weighting network (not shown), the output of which then rises from zero to 2.5 volts.

The time constant of the monostable multivibrator 210 is determined by the values of capacitor 211, resistance 212, and resistance 213, these values being such as to produce a multivibrator gate width of 10 microseconds. The trailing edge of this gate is applied as a "set" input to the monostable and bistable multivibrators on the second digit card, representing the next most significant digit. If a reset pulse is then obtained from the comparator circuit, the bistable multivibrator on the second digit card will be reset through reset gate 207, held open by monostable multivibrator 210 on the second digit card. Transistor 209 will then be cut off, and a second clamping diode will be released in the summing and weighting network (not shown) thus allowing its output to rise to 3.75 volts.

The collectors of the transistors 202 and 203 are clamped to ground in the positive direction through diodes 214 and 215 to prevent saturation in the transistors with the consequent turn-off delays caused by minority-carrier storage. The bistable multivibrators are prevented from saturating in the same fashion by means of diodes 219 and 271. "Hard" clamps of this type have the advantage over "soft" clamps of allowing collector voltage waveforms to be produced with well-defined D.C. levels even when transistors with widely-varying current gains are used in the multivibrators. The disadvantages of allowing multivibrators to saturate are the increased transition times incurred and the wider trigger pulses required. When a trigger pulse is applied to a saturated transistor with such a polarity as to back-bias its base-emitter diode, the input pulse must be at least as long as the sum of the storage time and the switching time from the "on" to the "off" state. The storage time can be as long as several microseconds, particularly if a transistor is driven deep into saturation by virtue of an unusually high current gain and a large, forward base current.

When the bistable multivibrator 220 is reset, it triggers a shift delay monostable multivibrator 270, made up of transistors 272 and 273, with a negative pulse through coupling capacitor 216 and diode 217. A pulse derived from the trailing edge of the five microsecond gate generated by 270 is applied to the shift carry gate 218. If the shift enabling gate transistor 445 on the shift card (to be fully described hereinafter) is in a conducting state at this time, a positive carry pulse is applied to the bistable multivibrator on the next digit card.

The shift circuit schematic diagram is shown in FIGS. 2*a* and 2*b*. A pulse derived from the trailing edge of the output pulse of the monostable multivibrator 210 on the eighth digit card is coupled through resistor 425 to the base of inverter amplifier transistor 401. The collector of transistor 401 is connected to terminal N through resistor 426 and the emitter is connected to ground. The collector is coupled through capacitor 427 and diode 428 to the collector of transistor 408. Diode 429 having a shunt resistor 431 is connected between capacitor 427 and terminal N. A voltage divider consisting of resistors 432, 433 and 434 connected in series is connected across terminals R and N. Resistor 435 is connected between the common connection of resistors 433 and 434 and the base of transistor 408. Capacitor 436 is connected across the base of transistor 408 and the collector of transistor 409, and capacitor 437 is connected across the base of transistor 409 and the collector of transistor 408. The collector of transistor 408 is connected to terminal N through resistor 438 and the base of transistor 409 is connected to terminal N through fixed resistor 439 and variable resistor 441. The collector of transistor 408 is connected to the base of transistor 403 through resistor 442 and to the base of transistor 414 through diode 412. The base of transistor 403 is connected to terminal R through resistor 443. The emitter is connected to terminal R through resistor 444, to the base of transistor 445 through resistor 430 and to the base of transistor 404 through resistor 446. The collector of transistor 445 is connected to terminal K. The collector of transistor 403 is coupled to ground through capacitor 447.

The collector of transistor 414 is coupled to the base of transistor 418 and to terminal R through resistor 448. The collector of transistor 417 is connected to terminal R through resistor 449 and the base is connected to the same terminal through resistor 451. The collector of transistor 418 is connected to terminal N through resistor 452 and coupled to ground through capacitor 453. The collector of transistor 418 is connected to R through resistor 454 and to terminal E.

The collector of transistor 404 is coupled to the emitter of transistor 419 and the emitter is connected to ground. The base of transistor 419 is coupled through resistor 455 and capacitor 456 to terminal J. Resistors 457 and 458 are connected respectively between the common connection of capacitor 456 and resistor 455, ground, and terminal M. The collector of transistor 419 is coupled to the base of tube 440 through capacitor 459 and diode 461. The collector is also connected to terminal R through resistor 462. Resistors 463 and 464 are connected in series across terminal N and ground to form a voltage divider. Capacitor 465 is connected across the base of transistor 440 and the collector of transistor 450 while capacitor 466 is connected across the base of transistor 450 and the collector of transistor 440. The collector of transistor 450 is connected to terminal R through resistor 468 and to the base of transistor 422 through resistor 469. Resistors 471, 472, and 473 are connected across terminals R and N to form a voltage divider. The base of transistor 450 is connected to the common connection of resistors 472 and 473 through resistor 474. The collector of transistor 422 is connected to terminal R through resistor 475 and to terminal F.

The operation of the shift card is as follows: A pulse derived from the trailing edge of the output pulse of the monostable multivibrator 210 on the eighth digit card is inverted in amplifier stage 401 on the shift card. The negative trigger pulse obtained is used to "set" the 90-microsecond monostable multivibrator gate generator 402 on the shift card. A 90-microsecond negative gating waveform is applied through emitter follower 403 to enable the serial output gate 404 on the shift card and the shift carry gates 218 on the digit cards. The 90-microsecond gating pulse is also used to gate on the 100 kc. shift oscillator 405, an asymmetrical, free-running multivibrator, with two-microsecond output pulses occurring every 10 microseconds. Multivibrator 405 is kept from saturating by diodes 406 and 407. When the 90-microsecond gate generator 402 is in the "reset" condition, transistor 408 is cut off and current through resistor 438, diode 412 and resistor 413 holds the base of transistor 414 in the shift oscillator at about nine volts. Since its emitter is returned to the three-volt supply, transistor 414 is held in the cutoff condition. When multivibrator 402 is triggered, however, the anode potential of diode 412 falls to ground level and the diode is reverse-biased. This allows the base voltage of transistor 414 to drop exponentially toward −10 volts as capacitor 415 charges through resistor 413. When the base level of transistor 414 falls below three volts, the transistor starts conducting and its rising collector voltage waveform is coupled through capacitor 416 to turn off transistor 417. Oscillation continues until the 90-microsecond gate pulse is terminated, at which time the base voltage of transistor 414 is increased to and held at nine volts, thus terminating the shift pulses. The asymmetrical collector waveforms of the shift multivibrator oscillator 405 are the result of unequal values of collector-to-base capacity. The positive shift pulses are applied to the bistable multivibrators on all eight digit cards in parallel through emitter follower 418.

During the shift operation a "one" in the bistable multivibrator 220 on the eighth digit card produces a negative pulse at the base of transistor 419 in the serial output gate. Since transistor 404 in this gate is already in a conducting state because of the negative 90-microsecond gate pulse from transistor 403, a positive pulse is produced at the collector of transistor 419 that triggers the output monostable multivibrator pulse generator 420. The positive multivibrator pulses are fed into an emitter follower, 422, that delivers 10-volt, 6-microsecond pulses from a source impedance of less than 200 ohms into the serial output line.

Obviously many modifications and variations of the present invention are possible in the light of the above teachings. It is therefore to be understood that within the scope of the appended claims the invention may be practiced otherwise than as specifically described.

I claim:

1. A shift register circuit comprising a first input, a transistor coupled to said input, a first monostable multivibrator coupled to the transistor, a first emitter follower coupled to the first monostable multivibrator, a second monostable multivibrator coupled to the first emitter follower, a second emitter follower coupled to the second monostable multivibrator, a shift oscillator coupled to the second emitter follower, a serial output gate coupled to said shift oscillator, and a serial output terminal coupled to said serial output gate.

2. A shift register circuit comprising two inputs, three outputs, a first transistor coupled to one of the inputs, a first monostable multivibrator coupled to the first transistor, a second transistor coupled to the first multivibrator and to the first output, a third transistor coupled to the other input and to the second transistor and the second output, a second monostable multivibrator coupled to the third transistor, a fourth transistor coupled to the second output and to the second monostable multivibraor, a shift oscillator coupled to the fourth transistor, and a fifth transistor coupled to the shift oscillator and to the third output.

References Cited in the file of this patent

UNITED STATES PATENTS

| | | |
|---|---|---|
| 2,911,544 | Ostendorf | Nov. 3, 1959 |
| 2,964,657 | Page | Dec. 13, 1960 |
| 2,999,170 | Tyler | Sept. 5, 1961 |
| 3,016,470 | Van Dine | Jan. 9, 1962 |
| 3,048,711 | Hofmann | Aug. 7, 1962 |